United States Patent [19]

Wolfe

[11] Patent Number: 4,741,083

[45] Date of Patent: May 3, 1988

[54] TOOL FOR UNPLUGGING FIRE HYDRANT DRAINS

[76] Inventor: Donald E. Wolfe, 2250 Grant Ave., St. Albans, W. Va. 25177

[21] Appl. No.: 1,760

[22] Filed: Jan. 9, 1987

[51] Int. Cl.[4] ............................................. B23P 19/04
[52] U.S. Cl. ............................ 29/213.1 R; 15/104.33; 29/402.06
[58] Field of Search .............. 29/157.1 R, 402.04, 29/402.06, 213 R; 137/15; 15/104.3 SN

[56] References Cited

U.S. PATENT DOCUMENTS

| | | | |
|---|---|---|---|
| 528,459 | 10/1894 | Beliveau | 15/104.3 SN X |
| 836,212 | 11/1906 | Pierce et al. | 408/114 |
| 1,866,714 | 7/1932 | King | 408/127 |
| 2,333,025 | 10/1943 | Mayer | 464/115 |
| 2,487,203 | 11/1949 | Wilber | 408/127 X |
| 2,951,281 | 9/1960 | Mason | 29/213 |
| 2,958,349 | 11/1960 | McNutt | 408/67 |
| 3,016,073 | 1/1962 | Broussard et al. | 408/85 |
| 3,248,786 | 5/1966 | Smith | 29/213 |
| 3,697,188 | 10/1972 | Pope | 408/230 |
| 4,139,931 | 2/1979 | Royce | 29/157.1 R |
| 4,184,795 | 1/1980 | Medlin | 408/127 |
| 4,364,140 | 12/1982 | Irwin | 15/104.3 SN |

FOREIGN PATENT DOCUMENTS 715862 9/1954 United Kingdom ........ 15/104.3 SN

Primary Examiner—Mark Rosenbaum
Assistant Examiner—Frances Chin
Attorney, Agent, or Firm—Fleit, Jacobson, Cohn & Price

[57] ABSTRACT

Fire hydrant drain holes are unplugged from within a hydrant barrel by removing the bonnet and valve gear from the top of the barrel and using a specialized drilling tool which is inserted into the barrel to fit on the valve seat. The tool has a drill bit which aligns with the drain hole and a flexible drive wire for the drill bit which extends to the top of the barrel for operation from above the hydrant.

5 Claims, 2 Drawing Sheets

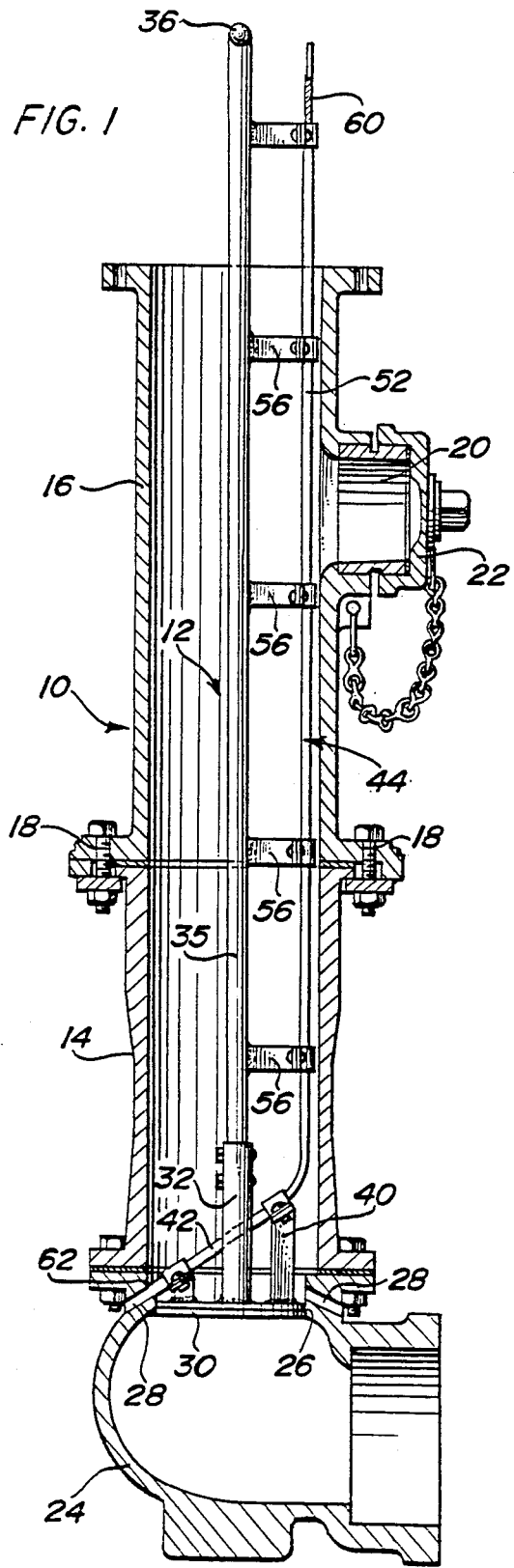
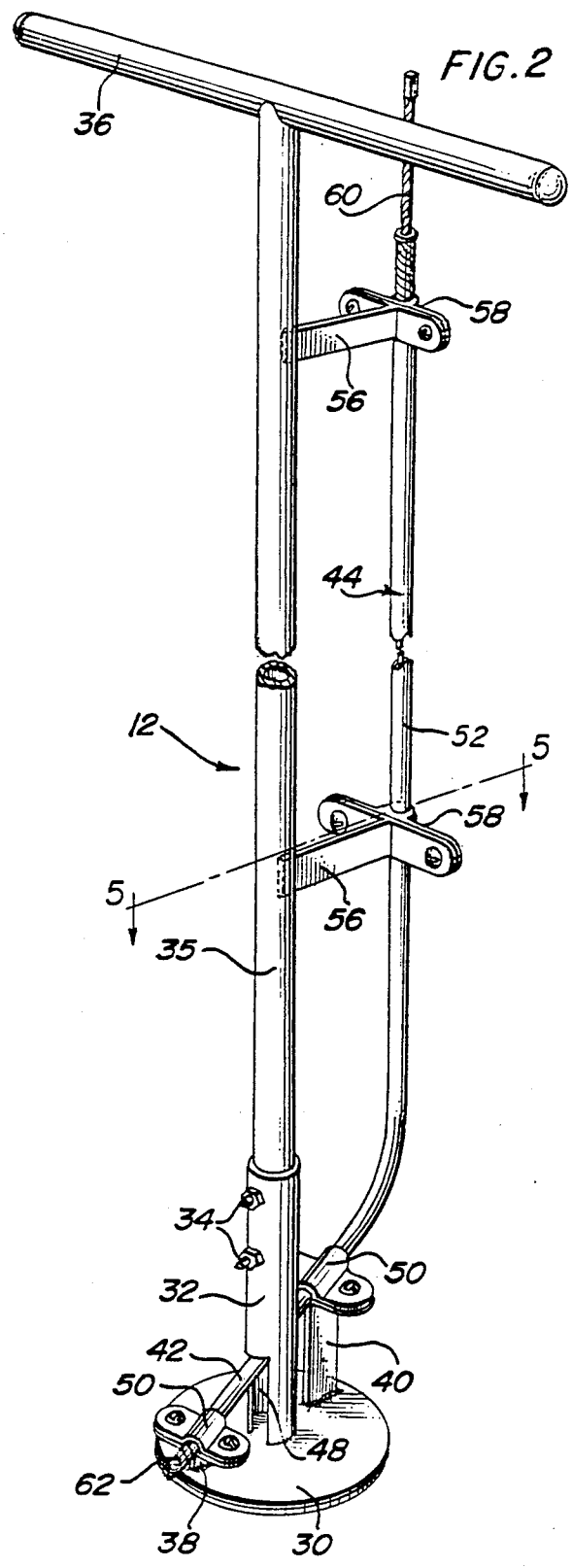

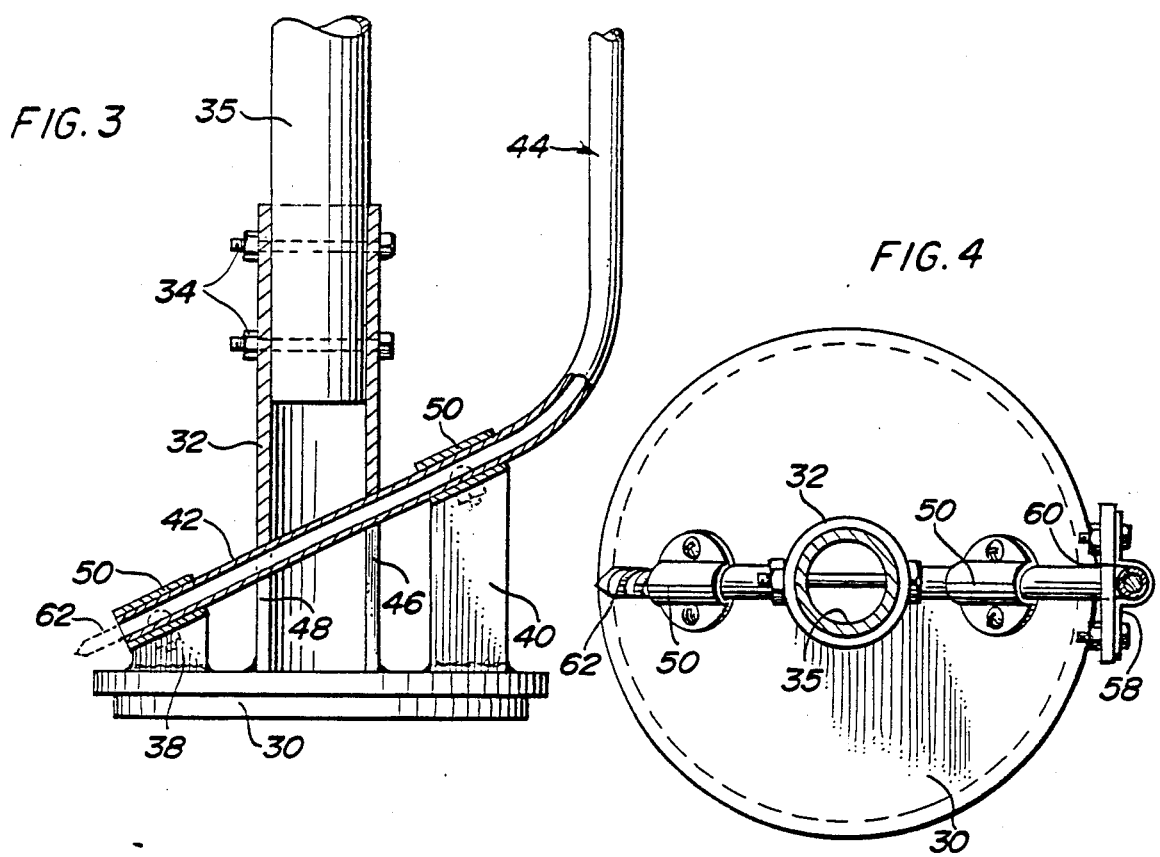
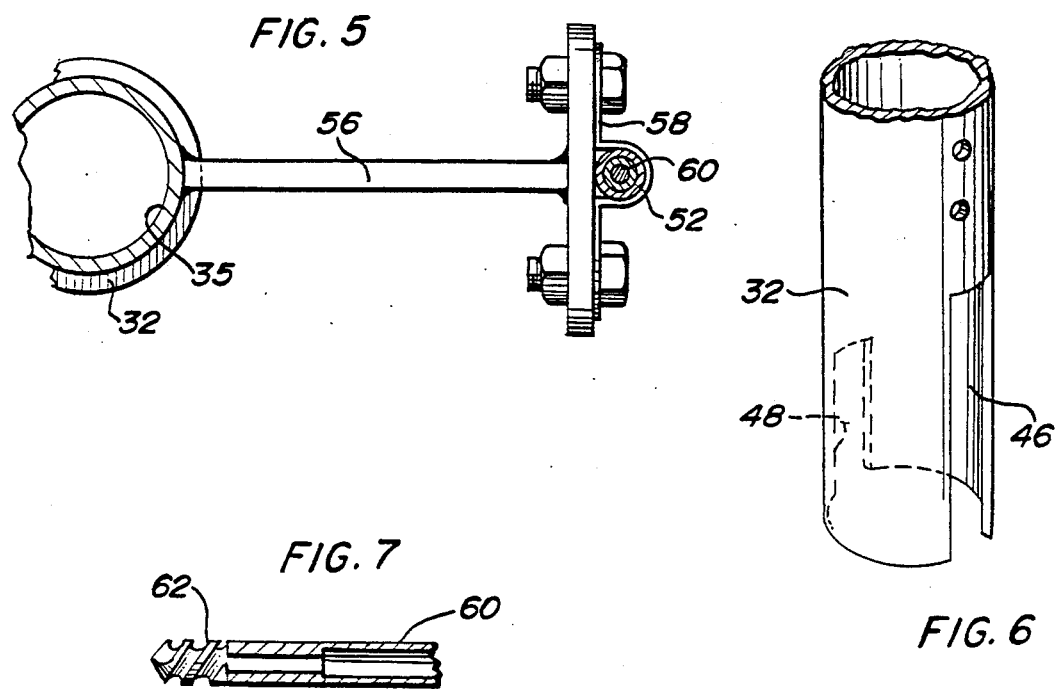

TOOL FOR UNPLUGGING FIRE HYDRANT DRAINS

BACKGROUND OF THE INVENTION

This invention relates to a method and apparatus for unplugging fire hydrant drain holes, sometimes referred to as weepholes.

Standard fire hydrants consist generally of a standpipe or barrel which is set in concrete or the like at ground level and which connects underground to a water supply. The barrel has a side-opening pumper nozzle outlet above ground level which is enclosed by a cap when not in use and a valve below ground level for controlling the water supply to the nozzle. The valve includes a valve plate or the like which seats at the lower end of the barrel and which has a stem extending to the upper end of the barrel where it is attached to an exposed operating nut which is rotated to open and close the valve thereby controlling water supply to the pumper nozzle.

In use of a hydrant, when the valve is opened, water fills the barrel and discharges through the pumper nozzle (with the cap removed). Then, when the valve is closed, after operation, an amount of water collects in the barrel above the valve. In order to drain the collected water from the barrel, for example so as to prevent freezing of the water and possible bursting of the equipment, fire hydrants commonly are provided with one or more drain or weepholes just above the valve seat and through which the collected water can drain away into the earth.

It is necessary, for adequate drainage of the collected water, that the drain holes are kept open, and this is usually effected by back-flushing the hydrant, namely opening the main valve with the pumper nozzle cap kept in place. Despite such treatments, however, the drain holes may still tend to clog with rust or dirt in general, in which case the hydrant barrel does not drain effectively, and it becomes necessary to unplug the drain holes. Commonly, this is done by digging around the hydrant through the concrete or the like in which it is embedded, to a depth of about 6 feet, to provide access to the drain holes, from the exterior of the hydrant. The digging and drain hole clearance can be an extremely time consuming operation, which can take 4 men upwardly of from 14 to 32 hours.

It is accordingly an object of the invention to provide a method and apparatus for unplugging fire hydrant drain holes, which does not involve digging around the hydrant, and which is accordingly speedier and more effective than known techniques. A more specific object of the invention is to provide a fire hydrant drain hole unplugging method and apparatus, the latter being in the form of a drilling-type tool which is used from inside the hydrant by prior removal from the top of the hydrant of the relevant bonnet and valve gear.

Applicant is aware of the following U.S. patents pertaining to drilling devices and the like. None of the patents, however, discloses or suggests a method and apparatus for unplugging fire hydrant drain holes as in the present invention.

U.S. Pat. No. 836,212, Nov. 20, 1906;
U.S. Pat. No. 1,866,714, July 12, 1932;
U.S. Pat. No. 2,333,025, Oct. 26, 1943;
U.S. Pat. No. 2,487,203, Nov. 8, 1949;
U.S. Pat. No. 2,958,349, Nov. 1, 1960;
U.S. Pat. No. 3,016,073, Jan. 9, 1962;
U.S. Pat. No. 3,697,188, Oct. 10, 1972;
U.S. Pat. No. 4,184,795, Jan. 22, 1980.

SUMMARY OF THE INVENTION

The invention provides a method and apparatus for unplugging fire hydrant drain holes from within a hydrant barrel, which involves removing the valve gear from the top of the hydrant by unscrewing the operating nut and removing the bonnet at the top of the hydrant barrel, inserting a specialized drilling tool into the hydrant barrel from the top of the hydrant, and using the drilling tool, which can be remotely operated from above the hydrant, to free the drain holes of obstructions from within.

The specialized drilling tool in accordance with the invention comprises a disc-like base plate shaped to fit on the hydrant valve seat in place of the valve plate which has been removed, an elongate stem and handle extending from the base plate for manipulating and positioning same on the valve seat, a drill bit attached to one end of a flexible drill bit drive wire, such as a downhead Hexicore snake wire, support means on the base plate for rotatably receiving a lower end of the drive wire and the drill bit, the support means being configured and related to the base plate for positioning the drill bit so as to align with a hydrant drain hole when the base plate is seated as aforesaid and suitably aligned circumferentially of the hydrant, and guide means for the drive wire extending upwardly in coextensive relation to the stem and handle, so that an upper end of the drive wire can be rotated, by a hand drill or the like, from the top of the tool to cause the drill bit to penetrate into and drill out the drain hole.

The support means may, for example, include a pair of support brackets on the base plate which support the lower end of a drive wire guide tube (the guide means) in a downwardly inclined disposition at an angle corresponding to the angle of the hydrant drain hole, the guide tube extending upwardly to the top of the tool generally parallel to the stem and being supported therefrom by suitable straps, brackets, or the like.

Using a tool in accordance with the invention for drilling out fire hydrant drain holes can significantly decrease the time required for unplugging such holes. For example, whereas the previous technique may have taken 4 workers 24–32 hours, the inventive tool and method may take 2 workers only 4 hours with no digging being required.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional elevational view of a fire hydrant showing a drain hole unplugging tool in accordance with the invention in use therein.

FIG. 2 is a perspective view of the tool.

FIG. 3 is an enlarged sectional elevational view of a bottom end of the tool.

FIG. 4 is a plan view of the bottom part of the tool.

FIG. 5 is a sectional view on line 5—5 of FIG. 2.

FIG. 6 is a perspective view of a bottom part of a stem portion of the tool.

FIG. 7 is a sectional view of a drill bit and part of a flexible drill bit drive wire forming part of the tool.

DESCRIPTION OF PREFERRED EMBODIMENT

FIG. 1 shows the relevant parts of a fire hydrant 10 after removal of the valve components and bonnet which have been replaced by an unplugging tool 12 in accordance with the invention. The illustrated parts of the fire hydrant 10 comprise a lower barrel section 14, and an upper barrel section 16, suitably connected thereto by screws 18 or the like, the upper barrel section having a side-opening pumper nozzle 20 and closure cap 22. The lower barrel section 14 is connected below ground to an elbow-type shoe fitting 24 for connecting the hydrant to a water supply in a known manner. The top of shoe fitting 24 is formed with a peripheral seat 26 for the hydrant valve plate (which has been removed) and immediately above the seat with diametrically opposed downwardly inclined drain holes 28 for draining collected water from the hydrant barrel as previously referred to. The tool 12 is for unplugging the drain holes should they become clogged.

Tool 12 includes a disc-type metal base plate 30 which is substantially of like shape to the hydrant valve plate so as to fit firmly and snugly on valve seat 26. Extending upwardly from plate 30 is a stem assembly comprising a base pipe 32 bolted at 34 to an elongate upper pipe 35 terminating in a transverse handle 36, it being understood that the overall height of the stem assembly is such as to enable the handle 36 to protrude above the top of the hydrant barrel when plate 30 is on seat 26.

Also mounted atop of plate 30 are support brackets 38, 40 for the lower inclined end 42 of a stainless steel guide tube 44. The lower tube end 42 extends through slots 46, 48 in base pipe 32 and the height of brackets 38 and 40 is such that the angle of tube end 42 responds to the angle of drain holes 28 of the hydrant. Clips 50 hold the tube in the brackets 38, 40. Tube 44 has an upper vertical portion 52 which extends in parallel with pipe 35 and terminates just short of handle 36. Portion 52 of the tube is supported from pipe 35 by bracket arms 56 with screw-on clips 58.

A drilling element in the form of a flexible drive wire 60 with a drill bit 62 welded to its lower end extends through the guide tube 44, the drill bit projecting at the lower end of the tube for insertion into one or other of the drain holes 28, the drill bit being of a suitable diameter for insertion therein. In practice, a drill bit may be welded to each end of wire 60 so that the drilling element can be reversed when one drill bit is worn. The flexible drive wire may be a downhead Hexicore snake wire or the like. It is understood that the brackets 38, 40 are accurately configured so that to relate the positioning of drill bit 62 to plate 30 in conformity with the position of drain holes 28 in relation to valve seat 26, so that when plate 30 is on the seat and suitably rotationally oriented, the drill bit is accurately positioned for entering the respective drain hole.

It is further understood that the drilling element is rotatably supported in the guide tube and, if necessary, suitable lubrication may be provided. A length of wire 60 is sufficient for its upper end to protrude above the 44.

A drain hole unplugging operation in accordance with the invention involves simply removing the fire hydrant bonnet and valve gear (after terminating the water supply) placing tool 12 into the hydrant from above, seating plate 30 on valve seat 26, manipulating the tool around until by feel, the tip of the drill bit 62 engages into one of the drain holes 28, and then drilling out the drain hole by rotating the upper end of drive wire 60 by means of a hand drill or battery-driven device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool for unplugging fire hydrant drain holes from within a hydrant comprising a disc-like base plate shaped to fit on a hydrant valve seat in place of a hydrant valve plate which has been removed, an elongate stem and handle extending from the base plate for manipulating the base plate and positioning same on the valve seat, a drill bit attached to one end of a flexible drill bit drive wire, support means on the base plate for rotatably receiving a lower end portion of the drive wire including the drill bit, the support means being configured and related to the base plate for positioning the drill bit so as to align with the hydrant drain hole when the base plate is seated as aforesaid and suitably aligned circumferentially of the hydrant, and guide means for the drive wire extending upwardly in generally coextensive relation to the stem and handle so that an upper end of the drive wire can be rotated from the top of the tool to cause the drill bit to penetrate into and drill out the drain hole.

2. The invention of claim 1 wherein the support means includes a pair of brackets on the base plate and the guide means includes a drive wire guide tube having a downwardly inclined lower end supported in said brackets at an angle corresponding to the angle of the hydrant drain hole, the guide tube extending upwardly to the top of the tool generally in parallel to the stem and being supported therefrom by suitable means.

3. The invention of claim 2 wherein the lower end of the tube extends through slot means at the bottom of the stem.

4. The invention of claim 1 wherein the drive wire has a further drill bit attached to the opposite end thereof.

5. The invention of claim 1 wherein the drive wire is a downhead Hexicore snake wire.

* * * * *